United States Patent [19]

Barajas

[11] Patent Number: 5,088,636
[45] Date of Patent: Feb. 18, 1992

[54] ROLLING TOOL BOX

[76] Inventor: Antonio J. Barajas, 12809 County 38, Rt. 1, Alvin, Tex. 77511

[21] Appl. No.: 663,626

[22] Filed: Mar. 4, 1991

[51] Int. Cl.[5] ............................................. B60R 9/055
[52] U.S. Cl. ................................. 224/281; 224/42.42; 224/315; 296/37.6
[58] Field of Search ............ 224/42.42, 281, 310, 224/311, 315, 273; 296/37.6

[56] References Cited

U.S. PATENT DOCUMENTS

| | | | |
|---|---|---|---|
| 3,471,045 | 10/1969 | Panciocco | 296/37.6 X |
| 3,580,439 | 5/1971 | Jewett et al. | 224/315 X |
| 4,635,992 | 1/1987 | Hamilton et al. | 224/273 X |
| 4,889,377 | 12/1989 | Hughes | 224/281 X |

*Primary Examiner*—Renee S. Luebke
*Attorney, Agent, or Firm*—Kenneth A. Roddy

[57] ABSTRACT

A rolling tool box for storing tools is slidably mounted and supported between channels installed on opposite side walls of a pickup truck bed such that it will move between a stored position at the forward end and a tailgate rear end of the truck bed. The tool box enclosure has a shallow rectangular upper storage compartment extending transversly between the channels and above the wheel wells of the truck bed and a rectangular lower storage compartment extending transversly between the wheel wells of the truck bed and above the floor of the bed. A latch handle on the upper storage compartment moves a pair of rod members between a lock position engaged with apertures in the channel members to prevent sliding movement of the tool box and a released position to allow sliding movement. The lower storage compartment is provided with a plurality of drawers which allows stored items to be neatly and efficiently organized. A door hinged to the lower compartment is movable between a closed position covering the drawers to prevent movement thereof and an open position allowing sliding movement of the drawers and access to the contents thereof. The door may be locked in the closed position to prevent the drawers from opening when the truck moves.

11 Claims, 1 Drawing Sheet

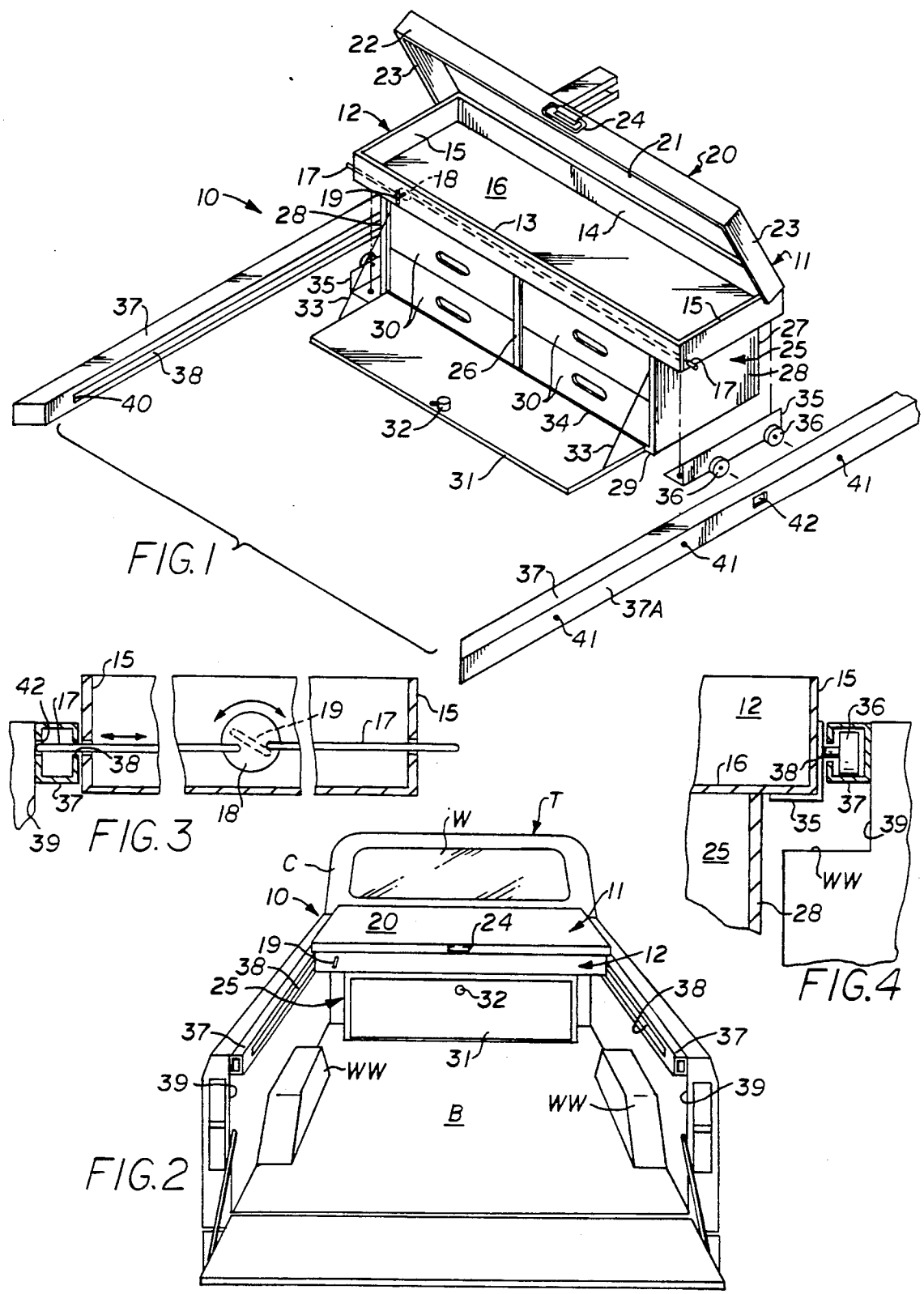

ROLLING TOOL BOX

BACKGROUND OF THE INVENTION

1. Field of the Invention

This invention relates to tool receptacles, and more particularly to a rolling tool box mounted on channels on the side walls of the bed of a pickup truck.

2. Brief Description of the Prior Art

Most workmen and tradesmen drive a pickup truck in their daily activities because the cargo area allows them to carry materials, supplies, and large tools. These workmen and tradesman also normally carry a tool box which contains their hand-tools. These tools are quite valuable to the workman, and are subject to being stolen when the tool box is left in the truck and the truck is unattended. The workman or tradesman also often outfits the pickup truck with a commercially available tool box of the type which is bolted to the truck bed just behind the cab of the truck and has a lid which may be locked. Some commercially available truck tool boxes have a pair of lids which raise from either side of the truck so that it is not required to get into the bed of the truck to gain access to the tools stored inside the tool box.

One of the major problems with most tool boxes of the prior art is that they have only one large rectangular central compartment which does not allow the tools and other stored items to be neatly stored in an organized manner. One must dig through all the tools in the compartment before finding the desired item. Gaining access to the center of the compartment is also a problem. Even with the dual lid type of tool boxes, it is usually necessary to climb into the bed of the truck in order to reach the center of the compartment.

There are several patents which disclose various tool boxes movably mounted in or on the bed of a pickup truck.

Tuohy, III, U.S. Pat. No. 4,522,326 discloses a rolling tool box having a rectangular configuration with rollers on the side which are received in a pair of fixed channel tracks fastened to the inside of the truck bed. A channel adapter having a closed rear end is pivotally mounted adjacent the rear end of the fixed channels receives the rollers and pivots upwardly from a horizontal position to install or removed the tool box. The Tuohy device utilizes a separate pole stored inside the fixed channel for locking the tool box from sliding. The pole has a hook on one end and when removed from the channel the pole is used to pull or push the tool box along the tracks. There is no provision for drawers to organize the stored items, and the drivers view through the rear window is partially blocked since the rectangular box fits above the wheel wells and extends above the top of the sides of the truck bed.

Wood, U.S. Pat. No. 3,826,529 discloses a cabinet having rollers carried in a channel track. The channel track is mounted on one side of the truck bed and has downwardly sloping ends which allow the cabinet to be removed and/or installed. There is no provision for locking the cabinet compartments or for locking the cabinet in position on the track.

Brown, U.S. Pat. No. 4,085,961 discloses a tool box mount having a frame which supports the tool box and is itself supported above the bed of a pickup truck. An arm assembly is pivotally mounted on a base secured to the bed of the truck. The mount allows for swinging movement over the bed between a position wherein the tool box can be opened for use and a position wherein the tool box cannot be opened for use.

Brady, U.S. Pat. No. 4,752,095 discloses a truck bed insert comprising a bedliner positionable on the truck bed and a box-like storage receptacle slidably mounted on the bedliner by wheels which fit into grooves in the bedliner surface. The storage receptacle has a handle which locks the receptacle in a position near the truck cab and allows it to be pulled to onto the tailgate for use. The storage receptacle fits between the wheel wells of the bedliner.

The present invention is distinguished over the prior art in general, and these patents in particular by a rolling tool box for storing tools which is slidably mounted and supported between channels installed on opposite side walls of a pickup truck bed such that it will move between a stored position at the forward end and a tailgate rear end of the truck bed. The tool box enclosure has a shallow rectangular upper storage compartment extending transversly between the channels and above the wheel wells of the truck bed and a rectangular lower storage compartment extending transversly between the wheel wells of the truck bed and above the floor of the bed. A latch handle on the upper storage compartment moves a pair of rod members between a lock position engaged with apertures in the channel members to prevent sliding movement of the tool box and a released position to allow sliding moment. The lower storage compartment is provided with a plurality of drawers which allows stored items to be neatly and efficiently organized. A door hinged to the lower compartment is movable between a closed position covering the drawers to prevent movement thereof and an open position allowing sliding movement of the drawers and access to the contents thereof. The door may be locked in the closed position to prevent the drawers from opening when the truck moves.

SUMMARY OF THE INVENTION

It is therefore an object of the present invention to provide a rolling tool box which is movably carried on the inside walls of the bed of a pickup truck and is selectively movable from the front to the back of the truck bed.

It is another object of this invention to provide a rolling tool box which will not obscure the view through the rear window of the truck in which it is installed.

Another object of this invention is to provide a rolling tool box which may be secured in place behind the cab of the truck to maintain the tool box in place when the vehicle is being driven.

Another object of this invention is to provide a rolling tool box having an upper storage compartment and a lower storage compartment with drawers in the lower compartment which allows the stored items to be neatly and efficiently organized.

A further object of this invention is to provide a rolling tool box which will prevent its user from having to climb in and out of the truck for his tools.

A still further object of this invention is to provide a rolling tool box which is simple in construction, inexpensive to manufacture, efficient in operation, and rugged and durable in use.

Other objects of the invention will become apparent from time to time throughout the specification and claims as hereinafter related.

The above noted objects and other objects of the invention are accomplished by a rolling tool box for storing tools which is slidably mounted and supported between channels installed on opposite side walls of a pickup truck bed such that it will move between a stored position at the forward end and a tailgate rear end of the truck bed. The tool box enclosure has a shallow rectangular upper storage compartment extending transversly between the channels and above the wheel wells of the truck bed and a rectangular lower storage compartment extending transversly between the wheel wells of the truck bed and above the floor of the bed. A latch handle on the upper storage compartment moves a pair of rod members between a lock position engaged with apertures in the channel members to prevent sliding movement of the tool box and a released position to allow sliding movement. The lower storage compartment is provided with a plurality of drawers which allows stored items to be neatly and efficiently organized. A door hinged to the lower compartment is movable between a closed position covering the drawers to prevent movement thereof and an open position allowing sliding movement of the drawers and access to the contents thereof. The door may be locked in the closed position to prevent the drawers from opening when the truck moves.

BRIEF DESCRIPTION OF THE DRAWINGS

FIG. 1 is an isometric view of a rolling tool box in accordance with the present invention shown in an unmounted condition.

FIG. 2 is a perspective view of the rolling tool box of FIG. 1 installed in the bed of a pickup truck.

FIG. 3 is a partial cross section through a portion of the upper storage compartment showing the latch handle mechanism.

FIG. 4 is a cross section through a channel member showing a roller inside the channel and illustrating the space between the upper and lower compartments and the truck wheel well.

DESCRIPTION OF THE PREFERRED EMBODIMENT

Referring to the drawings by numerals of reference, there is shown in FIG. 1, an exploded isometric view of a preferred rolling tool box assembly 10. FIG. 2, shows the assembly 10 installed in the bed B of a pickup truck T. The assembly 10 includes a generally rectangular tool box 11 having an upper storage compartment 12 and a lower storage compartment 25. The upper storage compartment 12 has opposed front 13 and rear 14 walls, opposed side walls 15, and a bottom wall 16 which define a shallow rectangular storage compartment. The height of the upper storage compartment 12 is such that it will not block the drivers view through the rear window W of the truck T.

As best seen in FIG. 3, a pair of rod members 17 are slidably mounted behind the front wall 13 and extend through apertures in the side walls 15. The inner ends of the rod members 17 are pivotally connected to a disk 18 which is connected to a latch handle 19 rotatably mounted on the exterior of the front wall 13 such that when the handle 19 is turned in one direction, the outer ends of the rod members 17 will be retracted inwardly toward the outer side walls 15 of the upper storage compartment 12, and when the handle 19 is rotated in the other direction, the outer ends of the rod members 17 will be extended outwardly from the side walls 15.

The latch handle 19 is preferably located near one side of the front wall 13 so that it can be operated by a person standing at the side of the truck bed.

A generally rectangular lid member 20 having a top wall 21, front wall 22, and opposed side walls 23 is hingedly secured along its back edge to the rear wall 14 of the upper storage compartment 12. In the closed position, the side walls 23 of the lid 20 extend partially over the upper portion of front and side walls 13 and 15 of the upper storage compartment 12. The height of the upper storage compartment 12 is sufficient to clear the top surface of the wheel wells WW of the pickup truck T (FIG. 4). A handle 24 is mounted on the front wall 22 of the lid 20 to facilitate pulling or pushing the tool box 11 as described hereinafter.

The tool box lower storage compartment 25 has opposed front 26 and rear 27 walls, opposed side walls 28, and a bottom wall 29. The front wall 26 has cut-out portions which slidably receive a series of drawers 30. The drawers 30 may be slidably mounted on tracks inside the lower storage compartment 25 in a conventional manner. The width of the lower storage compartment 25 is sufficient to clear the opposed facing surfaces of the truck wheel wells WW, and its height is sufficient to clear the bottom surface of the truck bed B.

A generally rectangular planar door member 31 is hingedly secured along its bottom edge to the bottom wall 29 of the lower storage compartment 25. In the closed position, the door 31 is closed over the drawers 30 and may be locked in the closed position by a conventional latch or cylinder key lock member 32. A cable 33 is connected between the door 31 and the lower storage compartment 25 to maintain the door in a horizontal open position perpendicular to the lower storage compartment 25. The cable 33 may include a retractable cable mechanism of the type conventional in the art. In use, door 31 is pivoted open on hinge 34, and is supported by the cables 33, and when closed, is locked by means of lock 32.

A pair of L-shaped angle members 35 are secured to the bottom wall 16 of the upper storage compartment 12 in opposed relation. The upstanding leg portion of each angle member 35 has a pair of longitudinally spaced rollers 36 rotatably mounted thereon.

A pair of elongate channel members 37 each having a slot 38 extending longitudinally from one end are mounted on the interior of the upper portion of the walls 39 of the truck bed B in opposed relation. The channel members 37 extend along the upper portion of the truck bed side walls 39 from just behind the cab portion C to the tailgate end of the bed. The slot 38 terminates a distance inwardly from one end of the channel members 37 to form a stopping surface 40. The channel members 37 are provided with a plurality of longitudinally spaced holes 41 through their outer wall 37A to receive conventional mounting hardware, such as nuts and bolts or screws, for mounting them to the truck side wall 39. The holes 41 also serve as a guide for drilling mating holes in the side wall 39.

A slot 42 is formed through the outer wall 37A of each channel 37 near the open end (toward cab) of the channel and receives the outer end of the rod members 17 when they are in their extended position (FIG. 3).

To install the rolling tool box assembly, the channels 37 are held in position along the upper portion of the bed side wall 39 and the side wall is marked through the holes 41 in the channel. The channels are removed and holes are drilled in the side wall. The L-shaped angle members 35 are placed into the channels with the rollers 36 engaged on the interior of the channels. The channels are again lifted into place and the mounting hardware is installed to secure them to the side walls.

The tool box 11 is then lifted into position with the bottom wall 14 of the upper storage compartment 12 over the horizontal legs of the angle members 25. Screws are then installed through the horizontal leg of the angle members into the bottom wall 14 of the tool box upper storage compartment 12.

OPERATION

In use, the tool box II is supported by rollers 36 in their channels 37 and stored at the front of the truck bed B just behind the truck cab C. In the stored position, the latch handle 19 is rotated to engage the outer ends of the rod members 17 in the slots 42 to prevent rolling movement, and the door 31 is locked in the up position to cover the drawers 30 and prevent them from sliding out as the truck moves.

The tool box may be used in its stored position behind the cab by lifting the lid 20 and access to the drawers 30 is gained by pulling the door 31 down to its horizontal position so that the drawers can be slid outward.

The tool box can also be moved to a position near the rear (tailgate end) of the truck bed by rotating the latch handle 19 to retract the outer ends of the rod members 17 from the slot 42, and the tool box 11 is rolled rearward in the channels 37 by a person standing at the side of the truck bed. A person may also climb into the bed and move the tool box by pulling or pushing the tool box or the handle 24 on the lid 20.

When the person is finished using the tool box, it is pushed to the forward end of the truck bed just behind the truck cab C and the latch handle 19 is rotated to engage the outer ends of the rod members 17 in the slots 42 to prevent rolling movement, and the door 31 is locked in the up position to cover the drawers 30 and prevent them from sliding out as the truck moves.

While this invention has been described fully and completely with special emphasis upon a preferred embodiment, it should be understood that within the scope of the appended claims the invention may be practiced otherwise than as specifically described herein.

I claim:

1. A rolling tool box comprising in combination, a generally rectangular box-like enclosure for storing tools therein and track means for slidably supporting said tool box between opposite side walls of a pickup truck bed so as to slide said tool box between a forward end and a tailgate rear end of said bed;

said rectangular box-like enclosure having a shallow rectangular upper storage compartment extending transversly between said track means and above the wheel wells of the truck bed and a rectangular lower storage compartment extending transversly between the wheel wells of the truck bed and above the floor of the bed, a pair of roller plates affixed on opposite side walls of said tool box upper compartment having a plurality of sidewardly extending shafts with rollers rotatably mounted thereon, and said track means being an elongate channel member mounted on an inner side of each truck bed side wall to extend substantially from one end of the bed adjacent the truck cab to the tailgate end of the bed and each apertured to receive and movably contain said rollers and having a stop surface adjacent the tailgate end of each said channel, whereby said tool box may be moved on said channels between a stored position adjacent the truck cab to a position adjacent the truck tailgate.

2. The rolling tool box combination according to claim 1 including latch means on said enclosure movable between a lock position engaged with said channel members to prevent sliding movement on said channels and a released position allowing sliding movement on said channels.

3. The rolling tool box combination according to claim 2 wherein said latch means comprises a latch handle rotatably mounted on said tool box upper storage compartment and pair of rod members operatively connected to said latch handle and slidably mounted such that when said latch handle is turned in one direction outer ends of the rod members will be retracted within outer sides of said upper storage compartment, and when said handle is turned in the other direction the outer ends of the rod members will extend outwardly beyond the outer sides of said upper storage compartment, and said channel members have an aperture in one side wall near their end adjacent the truck cab to receive and engage the outer ends of said rod members in their extended position.

4. The rolling tool box combination according to claim 3 wherein said latch handle is located near one side of said upper storage compartment such that it can be operated by a person standing at the side of the truck bed.

5. The rolling tool box combination according to claim 1 wherein said tool box lower storage compartment comprises opposed side walls, a bottom wall, a rear wall, and a front wall which is adapted to receive a plurality of drawers, a plurality of drawers slidably received in said lower storage compartment through said front wall, and locking means for preventing said drawers from sliding relative to said lower storage compartment.

6. The rolling tool box combination according to claim 5 wherein said locking means comprises a door hinged to said lower storage compartment and pivotally movable between a closed position covering said drawers to prevent movement thereof and an open position allowing sliding movement of said drawers and access to contents thereof.

7. The rolling tool box combination according to claim 6 including locking means on said door movable between a locked position to engage said lower storage compartment to maintain said door in said closed position covering said drawers and an unlocked position allowing said door to be opened for access to said drawers.

8. The rolling tool box combination according to claim 6 including cable means operatively connected between said door and said lower storage compartment to maintain said door in a horizontal open position perpendicular to said lower storage compartment.

9. The rolling tool box combination according to claim wherein said rectangular upper storage compartment comprises opposed front and rear walls, opposed side walls, and a bottom wall defining the shallow rectangular storage compartment.

10. The rolling tool box combination according to claim 9 including a lid member having opposed side walls, a front wall, and a top wall hinged to said upper storage compartment and pivotally movable between a closed position substantially covering said upper storage compartment and an open position allowing access to said upper storage compartment.

11. The rolling tool box combination according to claim 10 including a handle member mounted on said lid to facilitate pulling or pushing said tool box along said track means.

* * * * *